H. L. HANSELL.
LOCKED NUT.
APPLICATION FILED NOV. 8, 1915.
1,183,190.
Patented May 16, 1916.
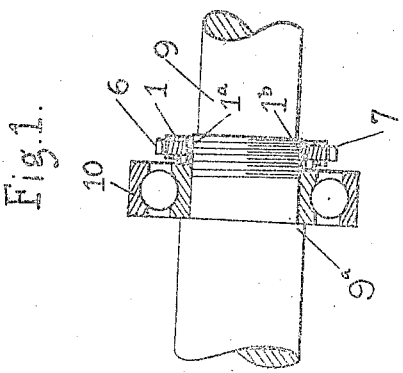
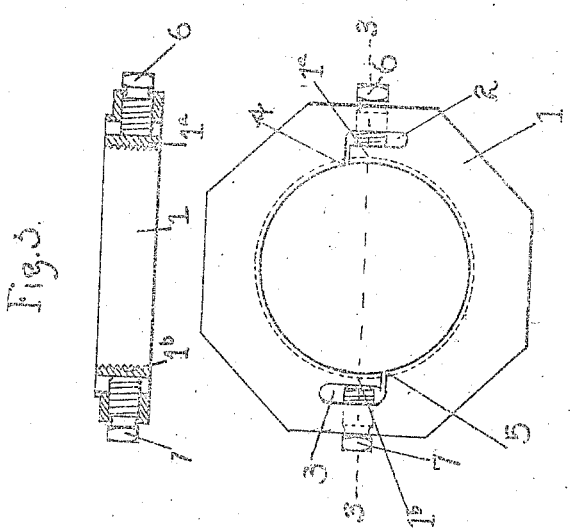

UNITED STATES PATENT OFFICE.

HORACE L. HANSELL, OF SPRINGFIELD, OHIO, ASSIGNOR TO THE BAUER BROTHERS COMPANY, OF SPRINGFIELD, OHIO, A CORPORATION OF OHIO.

LOCKED NUT.

1,183,190.  Specification of Letters Patent.  Patented May 16, 1916.

Application filed November 8, 1915. Serial No. 60,289.

*To all whom it may concern:*

Be it known that I, HORACE L. HANSELL, a citizen of the United States, residing at Springfield, in the county of Clark and State of Ohio, have invented certain new and useful Improvements in Locked Nuts, of which the following is a specification.

This invention relates to improvements in locked nuts, and the object of the invention is to provide a nut equipped with means of a simple nature by which the nut may be readily and effectively locked in position on a shaft or other device in connection with which it is designed to be used.

In the accompanying drawings:—Figure 1 is a longitudinal section of a ball bearing on a shaft showing my improved nut applied thereto. Fig. 2 is a side elevation of the nut. Fig. 3 is a section on the line 3—3 of Fig. 2.

In the said drawings, 1 represents a nut having a screw-threaded interior and an exterior of conventional form. The body of the nut is provided with two diametrically opposite recesses, 2 and 3, extending longitudinally through the nut, which may be formed by coring or in any other suitable way. Extending from the end of each recess to the interior of the nut are slits 4 and 5, which may be formed by sawing through that portion of the metal; each of the slits being preferably at that end of the corresponding recess opposite the direction in which the nut turns in tightening. Threaded into those portions of the nut between the exterior thereof and the recesses are set-screws 6 and 7, the inner ends of the set-screws bearing upon those portions of the nut 1ª and 1ᵇ which are separated from the main body of the nut by the recesses and slits.

In Fig. 1, I have shown the device applied to a shaft 9 for the purpose of holding a ball bearing 10 in position against the shouldered portion 9ª of the shaft, the nut being especially designed for this purpose. After the nut has been turned to proper position against the bearing, the set-screws are tightened down against the portions 1ª and 1ᵇ so as to cause the threads therein to tightly impinge the adjacent threaded portion of the shaft; the metal having enough resilience to permit of this and to also return to its normal position after being released by the set screws. In practice it has been found that this arrangement furnishes a simple, economical and effective way of securely locking the nut in position.

Having thus described my invention, I claim:—

1. In a locked nut, a body portion having a recess and also having a slit extending from one end of said recess to the interior of said body, and a set-screw in that portion of the body between the recess and the exterior thereof arranged to contact that portion of said body between said recess and the interior thereof.

2. In a locked nut, a main body portion having two diametrically opposite longitudinally extending recesses and also having slits extending from the ends of the respective recesses to the interior of said body, a set-screw threaded into those portions of the body between said recesses and the exterior thereof and arranged to bear against those portions of the body between said recesses and the interior thereof.

3. In a locked nut, the combination with a screwthreaded member, of a nut body having a screwthreaded interior threaded on said member and an exterior of conventional form, said body also having a longitudinally-extending recess and a slit extending from one end of said recess to the screwthreaded interior thereof, and a set-screw threaded into that part of said body between said recess and the exterior thereof and arranged to bear against that portion of said body between said recess and the interior thereof.

4. In a locked nut, the combination with a screwthreaded member, of a nut body having a screwthreaded interior threaded upon said member and an exterior of conventional form, said main body having diametrically-opposite longitudinally-extending recesses and a slit extending from the end of each recess to the screwthreaded interior thereof, and set-screws threaded into those portions of said main body between said recesses and the exterior thereof and bearing against those portions of said main body lying between said recesses and the interior thereof.

In testimony whereof, I have hereunto set my hand this 29th day of October, 1915.

HORACE L. HANSELL.

Witness:
CHAS. I. WELCH.